US012626150B2

(12) United States Patent
Kang et al.

(10) Patent No.: US 12,626,150 B2
(45) Date of Patent: May 12, 2026

(54) SELF-LEARNED REFERENCE MECHANISM FOR COMPUTER MODEL SELECTION

(71) Applicant: INTERNATIONAL BUSINESS MACHINES CORPORATION, Armonk, NY (US)

(72) Inventors: Jiang Bo Kang, Xian (CN); Yao Dong Liu, Xian (CN); Jun Wang, Xian (CN); Dong Hai Yu, Xian (CN); Bo Song, Xian (CN)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 17/809,354

(22) Filed: Jun. 28, 2022

(65) Prior Publication Data

US 2023/0419124 A1     Dec. 28, 2023

(51) Int. Cl.
*G06F 7/00*        (2006.01)
*G06N 5/022*        (2023.01)
*G06N 5/04*        (2023.01)

(52) U.S. Cl.
CPC .............. *G06N 5/022* (2013.01); *G06N 5/04* (2013.01)

(58) Field of Classification Search
CPC ................................ G06N 5/022; G06N 5/04
USPC ................................................ 707/600–899
See application file for complete search history.

(56) References Cited

U.S. PATENT DOCUMENTS

| | | | |
|---|---|---|---|
| 7,480,640 B1 | 1/2009 | Elad | |
| 2017/0270546 A1* | 9/2017 | Kulkarni | ........... G06Q 30/0201 |
| 2019/0180196 A1 | 6/2019 | Terry | |
| 2019/0311301 A1 | 10/2019 | Pyati | |
| 2020/0202171 A1 | 6/2020 | Hughes | |
| 2020/0302296 A1* | 9/2020 | Miller | ................... G06N 20/20 |

FOREIGN PATENT DOCUMENTS

| | | |
|---|---|---|
| CN | 101782976 B | 4/2013 |
| CN | 111768004 A | 10/2020 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Isaac M Woo
(74) *Attorney, Agent, or Firm* — Eric W. Chesley

(57) ABSTRACT

A method, system, and computer program product for self-learning reference mechanisms for model selection in AutoAI. The method identifies a set of data summary statistics within a data set. A data pattern group is identified within the set of data summary statistics. The data pattern group is determined to be mature. A model selection acceleration mechanism (MSAM) model is generated based on the data pattern group. The method predicts a set of top-k models for the data set based on the MSAM model.

17 Claims, 6 Drawing Sheets

200

210

IDENTIFYING A SET OF DATA SUMMARY STATISTICS WITHIN A DATA SET

220

IDENTIFYING A DATA PATTERN GROUP WITHIN THE SET OF DATA SUMMARY STATISTICS

230

DETERMINING THE DATA PATTERN GROUP IS MATURE

240

GENERATING A MODEL SELECTION ACCELERATION MECHANISM (MSAM) MODEL

250

PREDICTING A SET OF TOP-K MODELS FOR THE DATA SET BASED ON THE MSAM MODEL

300

310
PERFORMING RAW MODEL SELECTION ON A SET OF DATA

320
SELECTING A SECOND SET OF TOP-K MODELS FROM THE RAW MODEL SELECTION WHERE A FIRST SET OF TOP-K MODELS ARE PREDICTED BASED ON AN MSAM MODEL

330
EVALUATING THE MSAM MODEL

340
DETERMINING AN ACCURACY VALUE FOR THE MSAM MODEL IS BELOW AN ACCURACY THRESHOLD

350
GENERATING A SECOND MSAM MODEL BASED ON A SUBSEQUENT DATA PATTERN GROUP

SELF-LEARNED REFERENCE MECHANISM FOR COMPUTER MODEL SELECTION

BACKGROUND

Automated machine learning (AutoML) is a process of automating manual tasks that are used to build and train machine learning (ML) models. AutoAI is a variation of AutoML and similarly applies automation operations to build predictive ML models. AutoAI runs automated operations of data pre-processing, automated model selection, automated feature engineering, and hyperparameter optimization to build and evaluate candidate ML model pipelines.

SUMMARY

According to an embodiment described herein, a computer-implemented method for self-learning reference mechanisms for model selection in AutoAI is provided. The method identifies a set of data summary statistics within a data set. A data pattern group is identified within the set of data summary statistics. The data pattern group is determined to be mature. A model selection acceleration mechanism (MSAM) model is generated based on the data pattern group. The method predicts a set of top-k models for the data set based on the MSAM model.

According to an embodiment described herein, a system for self-learning reference mechanisms for model selection in AutoAI is provided. The system includes one or more processors and a computer-readable storage medium, coupled to the one or more processors, storing program instructions that, when executed by the one or more processors, cause the one or more processors to perform operations. The operations identify a set of data summary statistics within a data set. A data pattern group is identified within the set of data summary statistics. The data pattern group is determined to be mature. A model selection acceleration mechanism (MSAM) model is generated based on the data pattern group. The operations predict a set of top-k models for the data set based on the MSAM model.

According to an embodiment described herein, a computer program product for self-learning reference mechanisms for model selection in AutoAI is provided. The computer program product includes a computer-readable storage medium having program instructions embodied therewith, the program instructions being executable by one or more processors to cause the one or more processors to identify a set of data summary statistics within a data set. A data pattern group is identified within the set of data summary statistics. The data pattern group is determined to be mature. A model selection acceleration mechanism (MSAM) model is generated based on the data pattern group. The computer program product predicts a set of top-k models for the data set based on the MSAM model.

DETAILED DESCRIPTION

Figure 1:
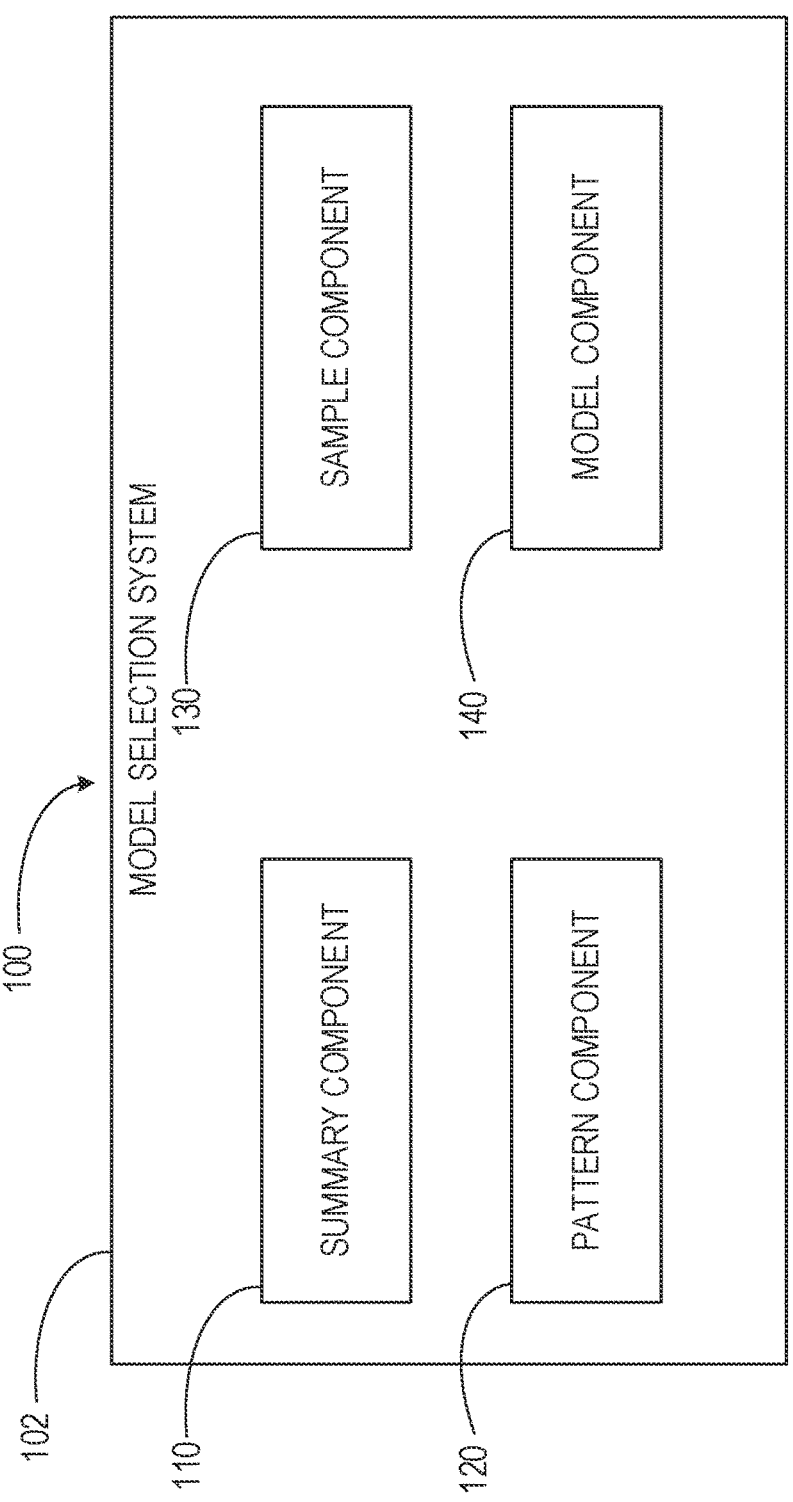
FIG. 1 depicts a block diagram of a computing environment for implementing concepts and computer-based methods, according to at least one embodiment.

The present disclosure relates generally to automated ML processes. More particularly, but not exclusively, embodiments of the present disclosure relate to a computer-implemented method for self-learned reference mechanisms for model selection in automated ML processes. The present disclosure relates further to a related system for automated ML processes, and a computer program product for operating such a system.

AutoAI runs automated operations including data pre-processing, automated model selection, automated feature engineering, and hyperparameter optimization to build and evaluate candidate ML model pipelines. AutoAI may operate by providing data in a structured file or database. The data is automatically prepared. A model type may be selected, at least in part based on the prepared data. The AutoAI process may then generate and rank model pipelines. Once generated and ranked, a model may be selected, saved, and deployed. Data preparation can include feature type detection, missing values imputation, and feature encoding and scaling. Models may be selected based on application of the model or algorithms to data within a data set. In generating and ranking model pipelines, the AutoAI process may optimize hyperparameters and perform feature engineering optimization. Some AutoAI implementations use a data allocation using upper bounds (DAUB) process. The DAUB process may be used for model selection in effort to improve efficiency and performance of AutoML and AutoAI.

Current automated ML model generation and selection implementations often impose limitations on candidate models for model selection operations. Such limitations may be imposed in effort to streamline automation of the ML process. Current implementations often fail to employ or utilize user data structures of one scenario for application to another scenario where commonalities between the data structures are discoverable. Often automated ML model generation operations are independently performed. While using outputs of a previous automated operation, the automated ML model generation processes often fail to leverage output, input, and data from previous operations in a contextually relevant way.

Embodiments of the present disclosure enable use of self-learned prior knowledge to improve model selection efficiency in AutoAI. The present disclosure enables use of descriptive and multinomial logistic regression models to address low speed of model building processes of AutoAI and AutoML. Embodiments of the present disclosure use self-learned prior knowledge based to build MSAM models. The present disclosure enables building MSAM models to predict top algorithms for given data sets. The present disclosure enables use of data pattern analysis to detect similar patterns within data sets subject to AutoAI operations. Embodiments of the present disclosure enable avoidance of DAUB duplicate workloads by reference of other experience and a centralized knowledge base. Some embodiments of the present disclosure enable AutoAI model selection of candidate models to be expanded to larger numbers than previous implementations.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 2:
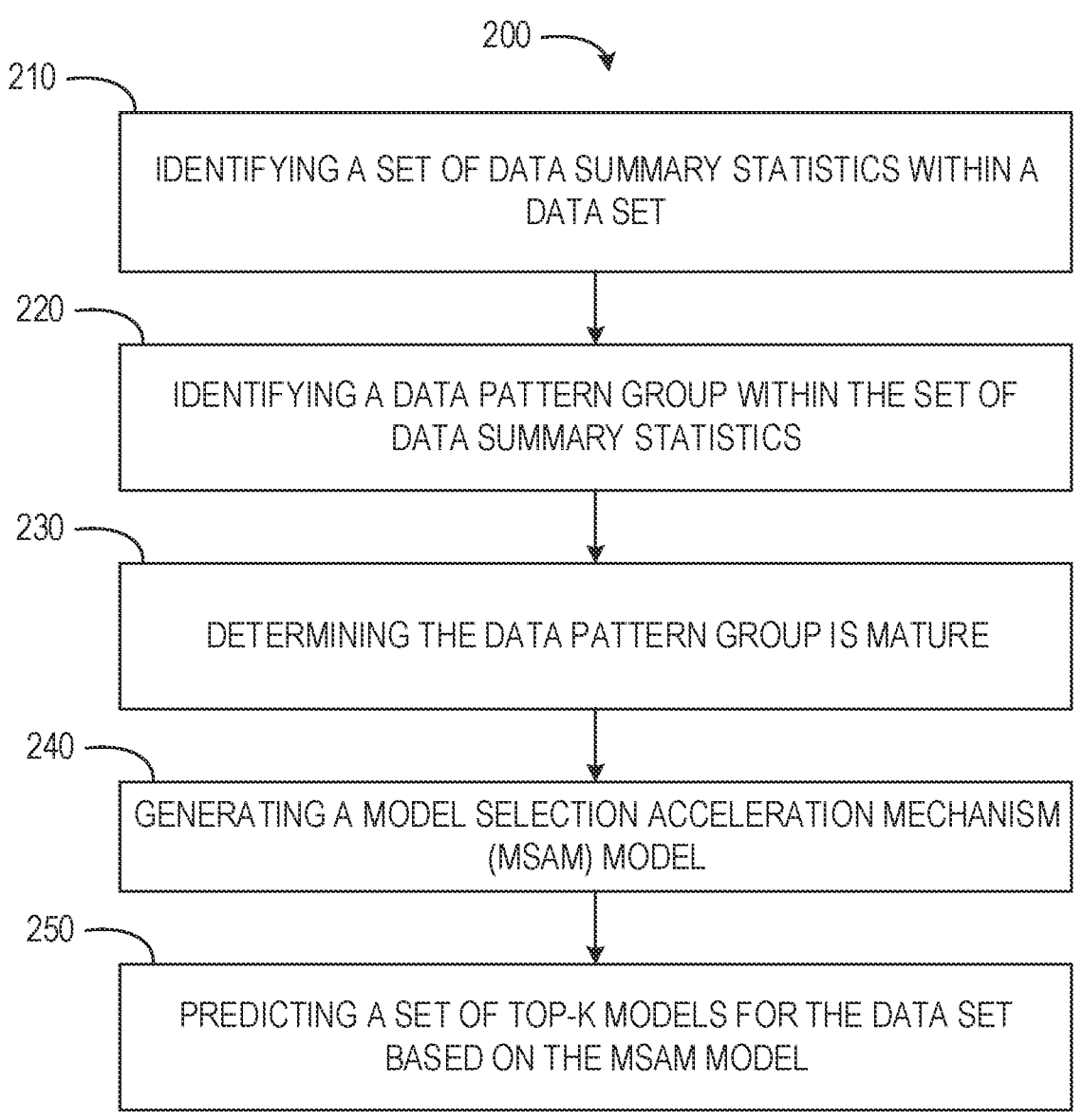
FIG. 2 depicts a flow diagram of a computer-implemented method for self-learning reference mechanisms for model selection in AutoAI, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a model selection system 102. The model selection system 102 may comprise a summary component 110, a pattern component 120, a sample component 130, and a model component 140. The summary component 110 identifies data summary statistics within data sets. The pattern component 120 identifies data pattern groups within data summary statistics. The sample compo- Referring now to FIG. 2, a flow diagram of a computer-implemented method 200 is shown. The computer-implemented method 200 is a method for self-learning reference mechanisms for model selection in AutoAI. In some embodiments, the computer-implemented method 200 may be performed by one or more components of the computing environment 100, as described in more detail below.

At operation 210, the summary component 110 identifies a set of data summary statistics within a data set. In some embodiments, the summary component 110 identifies the set of data summary statistics by retrieving features and target summary statistics. The summary component 110 may identify numeric variables and category variables as at least a portion of the data summary statistics. Numeric variables may include means, standard deviations, frequency, maximum and minimum values, ranges, combinations thereof, and any other suitable and relevant data summary statistics for a given data set. Category variables may include percentages, frequencies valid percentages, cumulative percentages, combinations thereof, and any other suitable and relevant data summary statistics for a given data set.

At operation 220, the pattern component 120 identifies a data pattern group within the set of data summary statistics. The data pattern group may be understood as a list of data with target/predictor descriptive measures and raw selected top k models. Each group may be one entity of a knowledge base. The pattern component 120 may identify the data pattern group for new data by specifying a group against a data scheme. In some instances, the pattern component 120 performs automated text mining using descriptive measures to identify patterns within a given set of data summary statistics and formulate the patterns into the data pattern group. In some instances, different data within a single data pattern group may not require a same number of predictors. An example of a formatted data pattern group is depicted within Table 1 below.

TABLE 1

| | age_mean | age_sd | ed_1_percent | ed_2_percent | ed_3_percent | emp_mean | emp_sd | income_mean |
|---|---|---|---|---|---|---|---|---|
| Co1 | 35.0 | 8.0 | 51.1 | 27.6 | 18.3 | 8.5 | 6.7 | 46.6 |
| Co2 | 36.1 | 7.8 | 54.8 | 26.1 | 18.0 | 8.3 | 7.4 | 47.4 |
| Co3 | 31.7 | 7.4 | 57.6 | 25.7 | 19.9 | 7.7 | 7.0 | 50.8 |
| Co4 | 36.1 | 8.4 | 56.6 | 29.3 | 18.1 | 8.9 | 6.4 | 49.5 |
| Co5 | 37.6 | 8.5 | 55.3 | 27.9 | 17.4 | 9.3 | 6.7 | 45.0 |

| | income_sd | cred/debt_mean | cred/debt_sd | default_0_freq | default_1_freq | top1_model | top2_model | top3_model |
|---|---|---|---|---|---|---|---|---|
| Co1 | 38.5 | 1.5 | 2.1 | 60.8 | 39.2 | XGB Classifier | LGBM Classifier | Logistic Regression |
| Co2 | 42.2 | 1.7 | 2.1 | 66.6 | 42.6 | XGB Classifier | LGBM Classifier | Logistic Regression |
| Co3 | 36.1 | 1.7 | 2.2 | 59.6 | 40.4 | LGBM Classifier | Logistic Regression | XGB Classifier |
| Co4 | 41.5 | 1.6 | 2.0 | 56.5 | 38.6 | XGB Classifier | Random Forest Classifier | LGBM Classifier |
| Co5 | 35.4 | 1.5 | 1.9 | 66.2 | 39.2 | Random Forest Classifier | Decision Tree Classifier | XGB Classifier | nent 130 determines data pattern group maturity. The model component 140 performs model selection, model generation, model evaluation, and predicts top-k models. Although described with distinct components, it should be understood that, in at least some embodiments, components may be combined or divided, and/or additional components may be added without departing from the scope of the present disclosure.

In some embodiments, the pattern component 120 identifies the data pattern group by identifying a subset of data having a set of predictors and at least one model of a set of top-k models generated from a raw model selection. The subset of data may be identified within a knowledge base.

At operation 230, the sample component 130 determines the data pattern group is mature. In some embodiments, the sample component 130 determines the data pattern group is mature by examining sample sizes within the data pattern group. In some instances, the sample component 130 may determine that a set of sample sizes within the data pattern group is sufficient to perform multinomial logistic regression on the data pattern group. Where the set of sample sizes is sufficient, the sample component 130 determines the data pattern group is mature. In some instances, once the data pattern group is mature, the pattern component 120 and the sample component 130 may cooperate to predict top-k selected models for new data of a same group within the data set. When the sample component 130 determines the data pattern group is mature, the sample component 130 passes the data pattern group or an indication thereof to the model component 140 to generate or update a MSAM model.

Where the sample component 130 determines the data pattern group is not mature, the sample component 130 may pass the data pattern group to the knowledge base or data set with an immature indicator. The components of the model selection system 102 may then update the knowledge base or data set and reattempt identification of the data pattern group and determine a maturity of the data pattern group upon inclusion of new data within the data set or the knowledge base.

In some embodiments, the summary component 110, the pattern component 120, and the sample component 130 may cooperate to generate a knowledge base for the data set. The knowledge base may include a set of data pattern groups (e.g., mature data pattern groups or immature data pattern groups), indications of top-k models, data summary statistics, and other suitable information. The knowledge base may be created and populated by entities (e.g., data pattern groups) when a data pattern group initially fails a maturity determination. When the data pattern group is not mature, the knowledge base may be updated and an entity may be added. In some instances, when a knowledge base is available and a new entity is created within the knowledge base, a raw model selection process is performed, as discussed below with respect to method 300.

At operation 240, the model component 140 generates a MSAM model. In some embodiments, the MSAM model is generated based on the data pattern group. The MSAM model may be generated after the sample component 130 communicates to the model component 140 that the data pattern group is mature. In some embodiments, the MSAM model is generated based on the data pattern group and a self-learning knowledge base. In some instances, when the data pattern group is determined to be mature, the model component 140 may build the MSAM model using a multinomial logistic regression model.

At operation 250, the model component 140 predicts a set of top-k models for the data set. In some embodiments, the set of top-k models are predicted based on the MSAM model. The model component 140 may use a deployment of the MSAM model in AutoAI processes as an alternative to a DAUB process to predict the top-k models. A number of models to be included in the top-k models may be determined by the model selection system 102. In some embodiments, the model selection system 102 may select the number of models for inclusion in the top-k models based on the data pattern group, a size of the data pattern group, data summary statistics within the data pattern group, or any other suitable factors. In some instances, for a remaining top-2 to top-k models, the model component 140 may predict the models using a prediction probability for high to low to identify the relevant models.

Embodiments of the method 200 enable automated generation and selection of ML models using descriptive and multinomial logistic regression models. The method 200 uses and leverages similarities between experimental data sets to increase efficiency and speed in automated ML processes. Some embodiments of the method 200 substitute self-learned prior knowledge bases, in place of DAUB processes, to build MSAM models for predicting top algorithms operating on a data set. Some embodiments of the method 200 enable self-evaluation and update of MSAM models.

Figure 3:
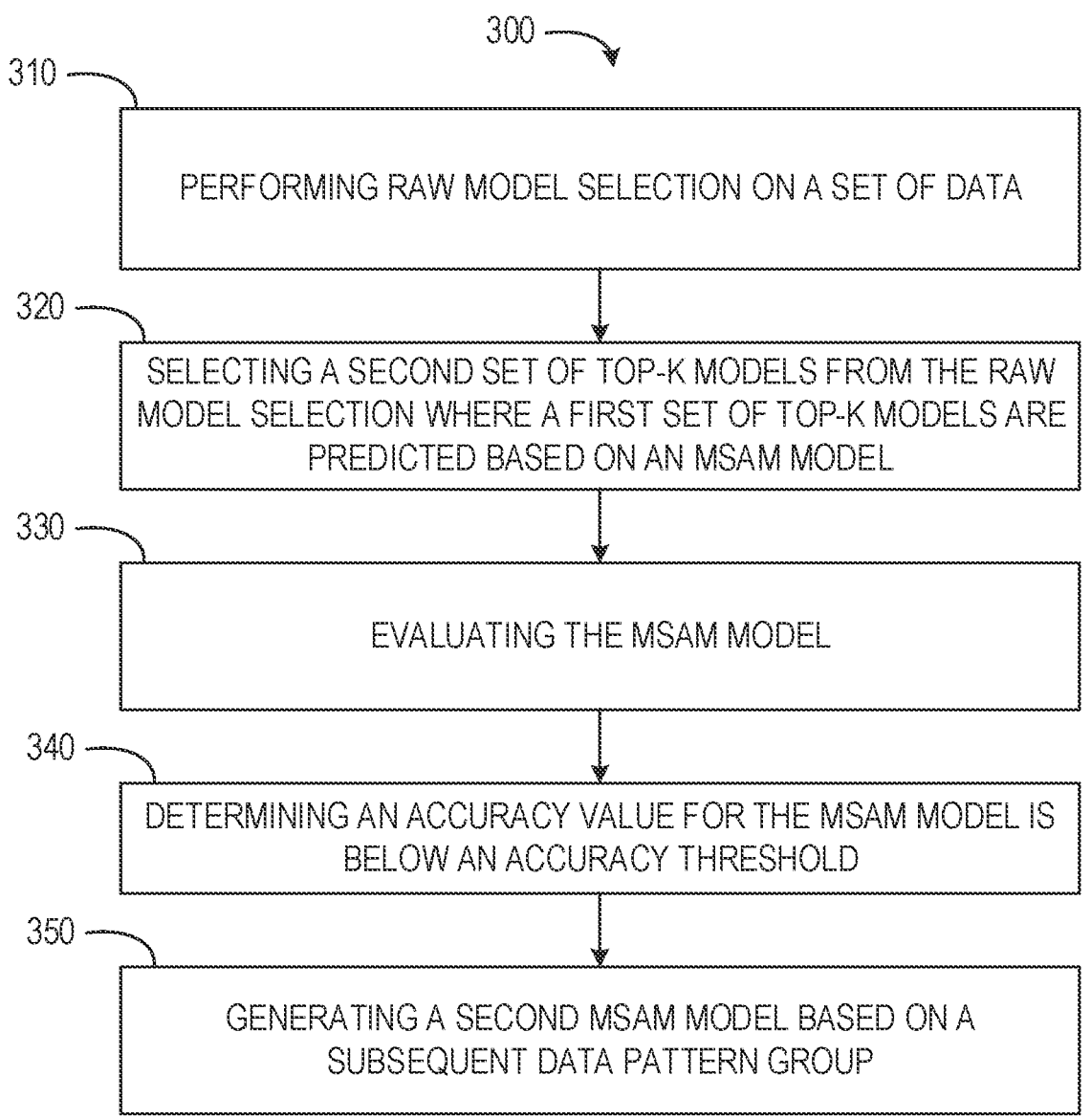
FIG. 3 depicts a flow diagram of a computer-implemented method for self-learning reference mechanisms for model selection in AutoAI, according to at least one embodiment.

FIG. 3 shows a flow diagram of an embodiment of a computer-implemented method 300 for self-learning reference mechanisms for model selection in AutoAI. The method 300 may be performed by or within the computing environment 100. In some embodiments, the method 300 comprises or incorporates one or more operations of the method 200. The method 300 may be performed contemporaneously or be triggered by performance of one or more operations of the method 200. In some instances, operations of the method 300 may be incorporated as part of or sub-operations of the method 200.

In operation 310, the model component 140 performs raw model selection on the set of data. The model component 140 may perform raw model selection in a background as one or more components of the model selection system 102 is actively performing operations of the method 200. In some instances, the model component 140 performs raw model selection after data pattern groups are determined to be mature by the sample component 130 in operation 230. The model component 140 may perform raw model selection to update data pattern groups within the data set in a given knowledge base.

In some instances, the method 300 is run in parallel or along with the method 200. In such instances, the set of top-k models selected in operation 250 is a first set of top-k models.

In operation 320, the model component 140 selects a second set of top-k models from the raw model selection. The model component 140 may select the second set of top-k models in a manner similar to described above with respect to operation 250 and using models of the raw model selection as models from which the second set of top-k models are selected.

Once the model component 140 selects the second set of top-k models, the second set of top-k models, or an indication thereof, may be incorporated into the data set or knowledge base. The knowledge base may include mature data pattern groups, immature data pattern groups, data summary statistics, indications of the second set of top-k models, and other suitable information. In some embodiments, the data set or knowledge base includes indications of the first set of top-k models, once generated by the method 200.

In operation 330, the model component 140 evaluates the MSAM model. In some embodiments, the MSAM model is evaluated based on the first set of top-k models. The model component 140 may also evaluate the MSAM model based on a combination of the first set of top-k models and the second set of top-k models. The model component 140 may evaluate the MSAM model after deployment by conducting raw model selection for each prediction of the MSAM model. The model component 140 may then evaluate an accuracy value of the MSAM model for each prediction.

In operation 340, the model component 140 determines an accuracy value for the MSAM model. The accuracy value may be determined to be below an accuracy threshold. If a latest n prediction accuracy is lower than the accuracy threshold, the MSAM model may be selected for revision.

In operation 350, the model component 140 generates a second MSAM model. The second MSAM model may be generated based on a subsequent data pattern group of the data set or the knowledge base. The subsequent data pattern group may be a newest or latest data pattern group. In some instances, the subsequent data pattern group may be a larger data pattern group than a data pattern group initially used for generating the MSAM model. In some embodiments, in generating the second MSAM model, the model component 140 may select the subsequent data pattern group as a data pattern group having at least one aspect different from the data pattern group used to generate the first MSAM model. In some embodiments, the model component 140 generates the second MSAM model as a subsequent MSAM model. In such instances, the model component 140 may automatically generate one or more subsequent MSAM models until the newly generated MSAM model is evaluated as having an accuracy value above the accuracy threshold.

Figure 4:
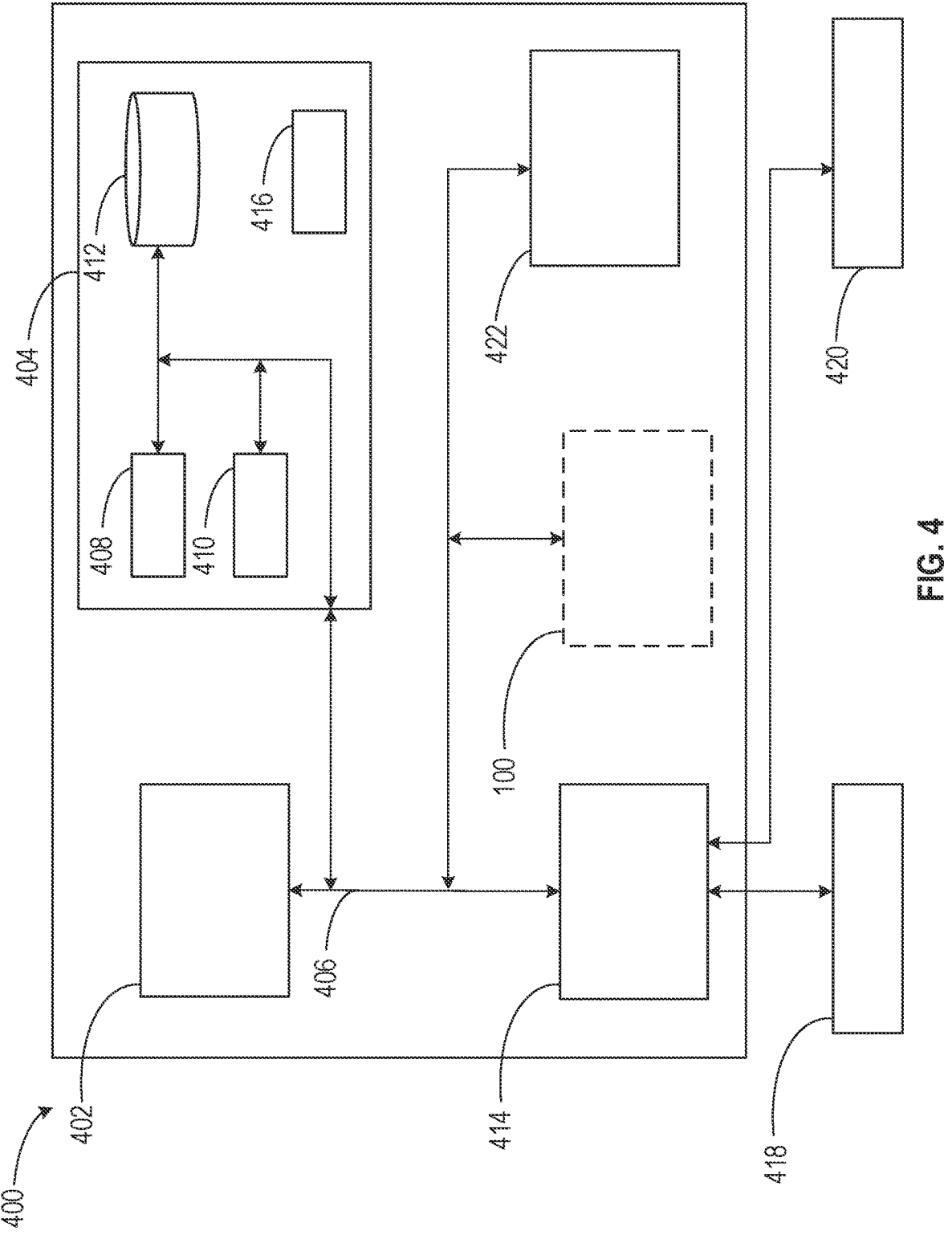
FIG. 4 depicts a block diagram of a computing system for self-learning reference mechanisms for model selection in AutoAI, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for self-learning reference mechanisms for model selection in AutoAI.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the summary component 110, the pattern component 120, the sample component 130, and the model component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
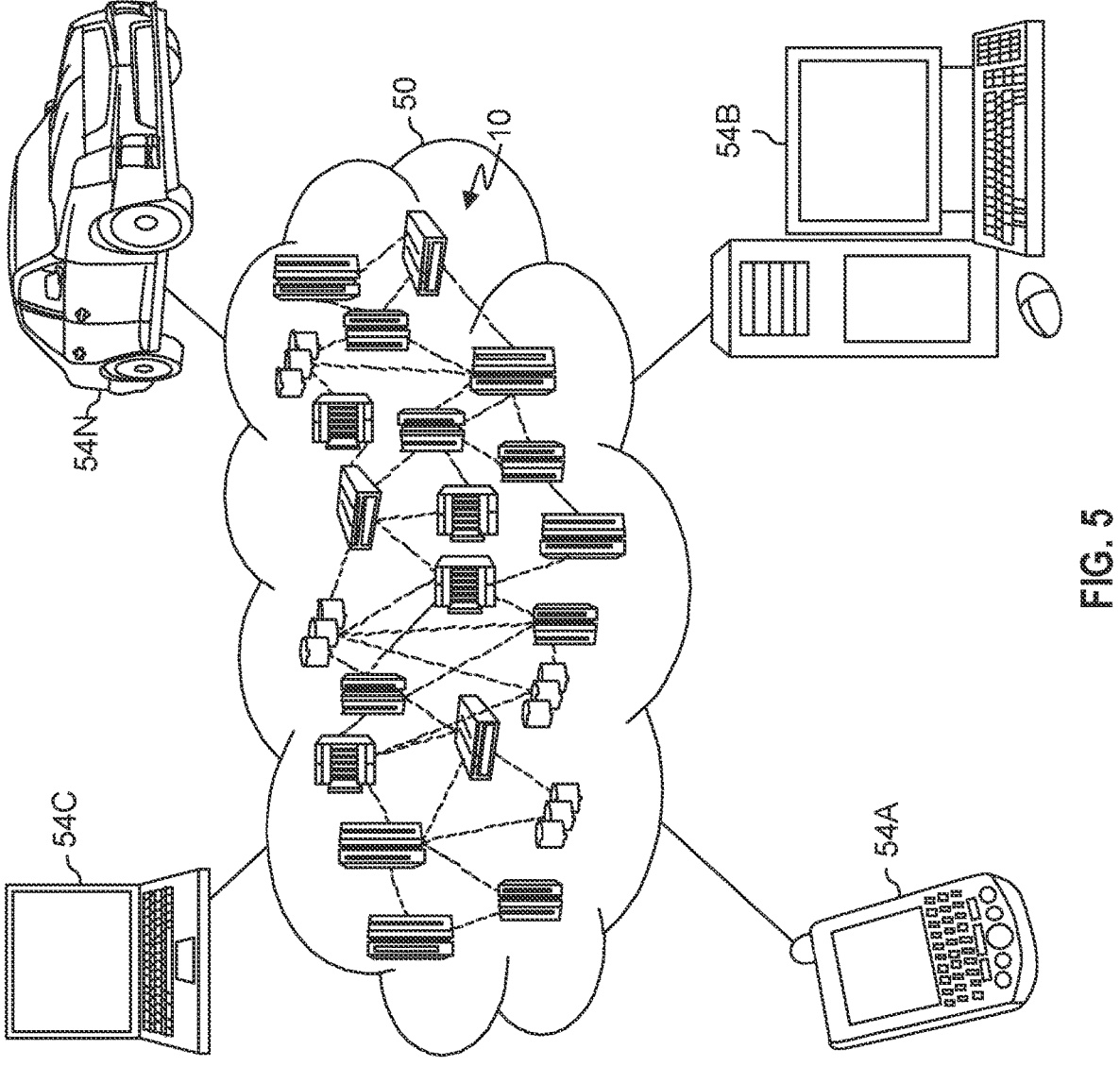
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
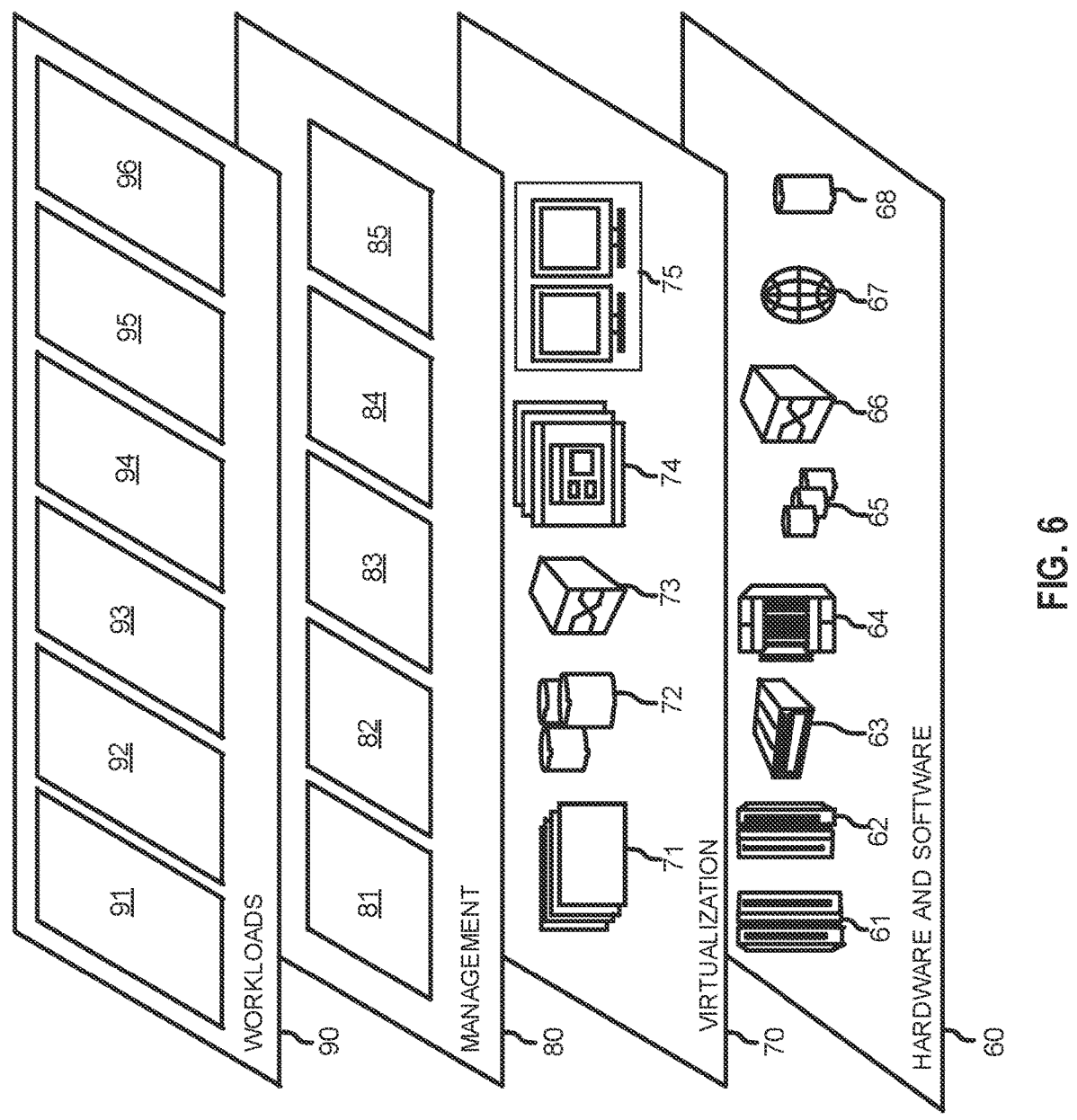
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying a set of data summary statistics within a data set;
identifying a data pattern group within the set of data summary statistics; determining that the data pattern group is immature based on a determination that sample sizes within the data pattern group do not allow multinomial logistic regression to be performed on the data pattern group; creating a knowledge base using the data set; updating the knowledge base with a new data set;
reevaluating maturity of the data pattern group in the knowledge base; determining that the data pattern group is now mature based on a determination that sample sizes within the data pattern group allow multinomial logistic regression to be performed on the data pattern group;
generating a model selection acceleration mechanism (MSAM) model using the data pattern group of the knowledge base to predict a set of top-k models for operating on the data pattern group; and
executing the MSAM model to output the predicted set of top-k models for operating on the data pattern group.

2. The method of claim 1, wherein the set of top-k models is a first set of top-k models, the method further comprising:
performing raw model selection on the set of data; and
selecting a second set of top-k models from the raw model selection.

3. The method of claim 2, wherein identifying the data pattern group further comprises:
identifying, within the knowledge base, a subset of data having a set of predictors and at least one model of the second set of top-k models generated from raw model selection.

4. The method of claim 2, further comprising:
evaluating the MSAM model based on the first set of top-k models and the second set of top-k models.

5. The method of claim 4, wherein the MSAM model is a first MSAM model, the method further comprising:
determining that an accuracy value for the MSAM model is below an accuracy threshold; and
generating a second MSAM model based on a subsequent data pattern group of the data set.

6. The method of claim 1, wherein the knowledge base is a self-learning knowledge base configured to self-evaluate maturity of data pattern groups within the data set.

7. A system, comprising:

one or more processors; and a computer-readable storage medium, coupled to the one or more processors, storing program instructions that, when executed by the one or more processors, cause the one or more processors to perform operations comprising:

identifying a set of data summary statistics within a data set;

identifying a data pattern group within the set of data summary statistics; determining that the data pattern group is immature based on a determination that sample sizes within the data pattern group do not allow multinomial logistic regression to be performed on the data pattern group; creating a knowledge base using the data set; updating the knowledge base with a new data set; reevaluating maturity of the data pattern group in the knowledge base;

determining that the data pattern group is now mature based on a determination that sample sizes within the data pattern group allow multinomial logistic regression to be performed on the data pattern group;

generating a model selection acceleration mechanism (MSAM) model using the data pattern group of the knowledge base to predict a set of top-k models for operating on the data pattern group; and executing the MSAM model to output the predicted set of top-k models for operating on the data pattern group.

8. The system of claim 7, wherein the set of top-k models is a first set of top-k models, the operations further comprising:

performing raw model selection on the set of data; and selecting a second set of top-k models from the raw model selection.

9. The system of claim 8, wherein identifying the data pattern group further comprises:

identifying, within the knowledge base, a subset of data having a set of predictors and at least one model of the second set of top-k models generated from raw model selection.

10. The system of claim 8, wherein the operations further comprise:

evaluating the MSAM model based on the first set of top-k models and the second set of top-k models.

11. The system of claim 10, wherein the MSAM model is a first MSAM model, the operations further comprising:

determining that an accuracy value for the MSAM model is below an accuracy threshold; and generating a second MSAM model based on a subsequent data pattern group of the data set.

12. The system of claim 7, wherein the knowledge base is a self-learning knowledge base configured to self-evaluate maturity of data pattern groups within the data set.

13. A computer program product comprising a computer readable storage medium having program instructions embodied therewith, the program instructions being executable by one or more processors to cause the one or more processors to perform operations comprising:

identifying a set of data summary statistics within a data set;

identifying a data pattern group within the set of data summary statistics;

determining that the data pattern group is immature based on a determination that sample sizes within the data pattern group do not allow multinomial logistic regression to be performed on the data pattern group; creating a knowledge base using the data set; updating the knowledge base with a new data set; reevaluating maturity of the data pattern group in the knowledge base;

determining that the data pattern group is now mature based on a determination that sample sizes within the data pattern group allow multinomial logistic regression to be performed on the data pattern group;

generating a model selection acceleration mechanism (MSAM) model using the data pattern group of the knowledge base to predict a set of top-k models for operating on the data pattern group; and executing the MSAM model to output the predicted set of top-k models for operating on the data pattern group.

14. The computer program product of claim 13, wherein the set of top-k models is a first set of top-k models, the operations further comprising:

performing raw model selection on the set of data; and selecting a second set of top-k models from the raw model selection.

15. The computer program product of claim 14, wherein identifying the data pattern group further comprises:

identifying, within the knowledge base, a subset of data having a set of predictors and at least one model of the second set of top-k models generated from raw model selection.

16. The computer program product of claim 14, wherein the operations further comprise:

evaluating the MSAM model based on the first set of top-k models and the second set of top-k models.

17. The computer program product of claim 16, wherein the MSAM model is a first MSAM model, the operations further comprising:

determining that an accuracy value for the MSAM model is below an accuracy threshold; and generating a second MSAM model based on a subsequent data pattern group of the data set.

* * * * *